UNITED STATES PATENT OFFICE.

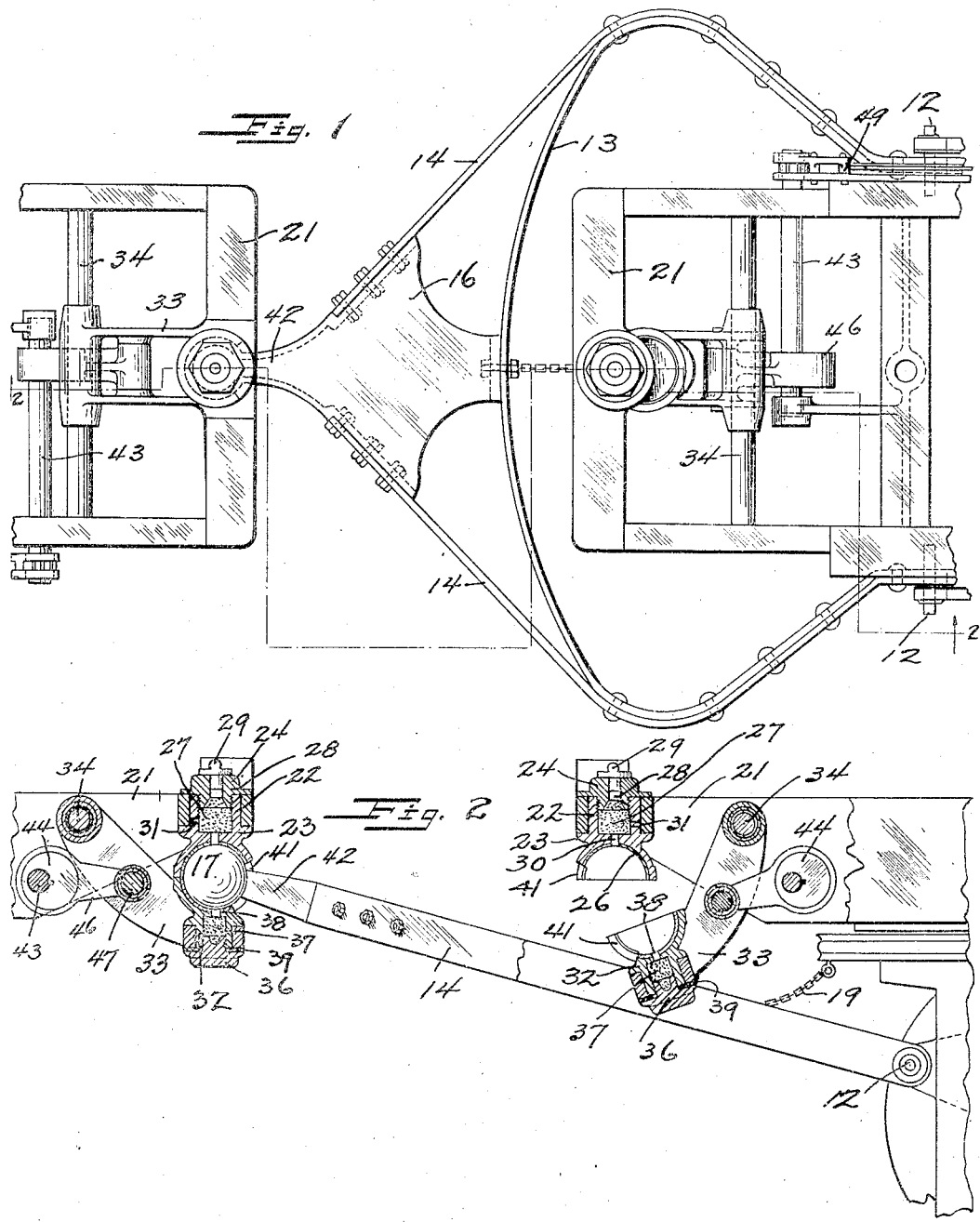

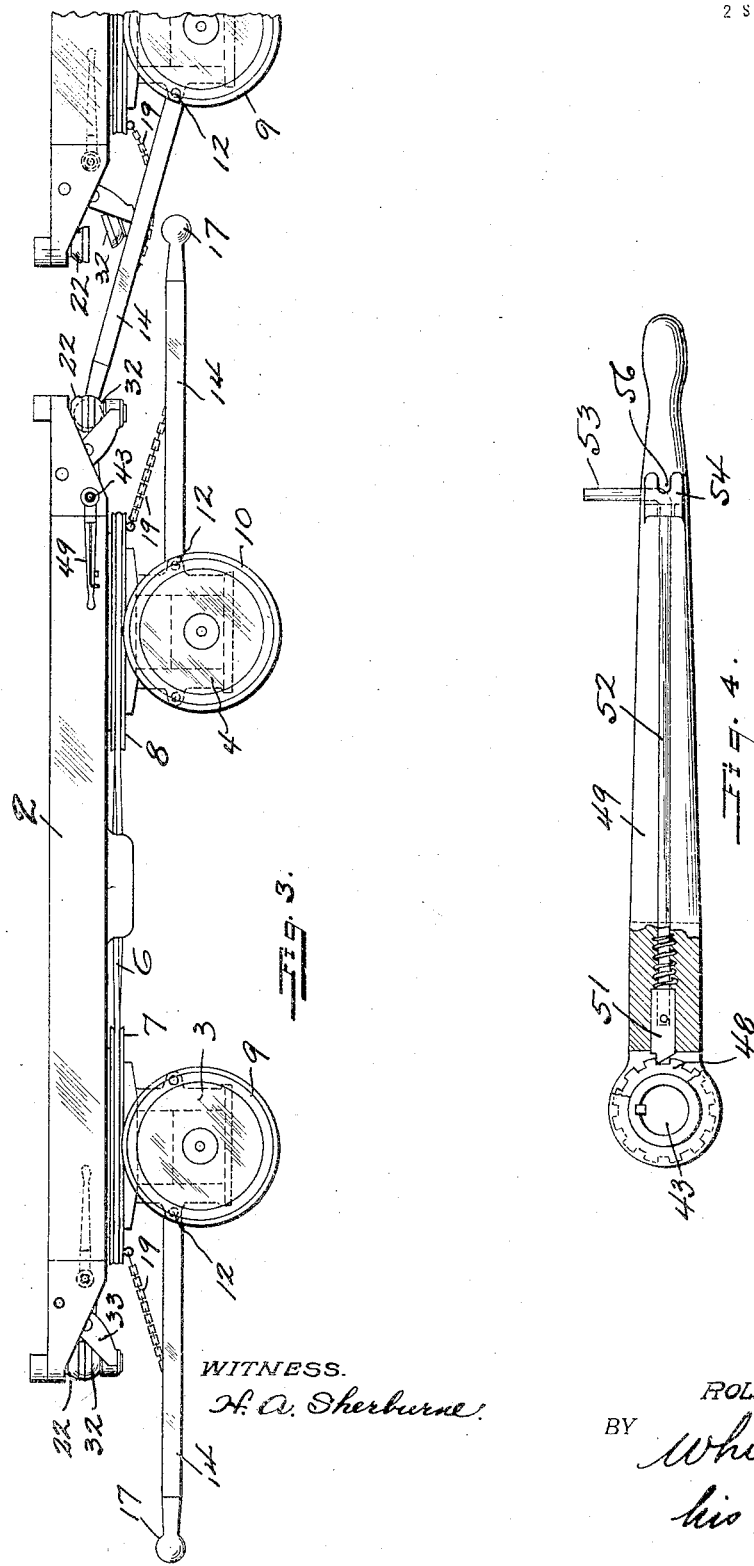

ROLLIE B. FAGEOL, OF OAKLAND, CALIFORNIA.

COUPLING FOR VEHICLES.

1,407,019.  Specification of Letters Patent.  Patented Feb. 21, 1922.

Application filed May 26, 1919. Serial No. 299,879.

*To all whom it may concern:*

Be it known that I, ROLLIE B. FAGEOL, a citizen of the United States, and a resident of Oakland, county of Alameda, and State of California, have invented a new and useful Coupling for Vehicles, of which the following is a specification.

My invention relates to means for coupling vehicles together.

An object of the invention is to provide a means for coupling vehicles together and especially the cars of road trains.

Another object of the invention is to provide a coupling in which frictional resistance is reduced to a minimum.

Another object of the invention is to provide a coupling which permits universal motion of one vehicle with respect to the other while maintaining tight connection between the two vehicles.

A further object of the invention is to provide a tight coupling which may be readily engaged from the side of the vehicle.

The invention possesses other features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to the drawings:

Figure 1 is a plan view of a portion of two cars and of the coupling for connecting them.

Figure 2 is a vertical sectional view of the structure shown in Figure 1, the planes of section being indicated in Figure 1 by the line 2—2.

Figure 3 is a side elevation of an entire car and a portion of a second car coupled to the first, showing the coupling of my invention in use.

Figure 4 is a detail of construction.

The car frame or chassis 2 is mounted on trucks 3 and 4 pivotally connected to the chassis and connected to each other by means of the chain or cable 6 which passes around sheaves 7 and 8 for the purpose of co-ordinating the pivotal movement of the trucks so that the wheels 9 and 10 will accurately track, one after the other. Permanently pivotally connected to each truck by pins 12, and extending outwardly past the end of the chassis, is a coupling link or draw-bar, preferably formed, as shown in Figure 1, of a bar 13 bowed about the end of the car and in the ends of which the pivot pins 12 are placed. Re-enforcing bars 14 are riveted to the bow 13 and extend outwardly where they are joined to a plate 16 terminating in a preferably spherical head 17. The plate 16 is also secured to the bowed bar, thus serving as a stiffening web between the bars. A chain 19 connecting the coupling link to the sheave prevents the falling of the uncoupled link. The bowed form of link gives a desirable resiliency in the coupling link and at the same time provides a structure which clears the end of the chassis and the coupling parts at all times.

A coupling link is pivotally attached to the truck at each end of each vehicle, and in coupling two vehicles together the forward link on the second vehicle is connected to the rear end of the chassis of the first vehicle, and means are provided for journaling the link on the chassis so that the link of the second vehicle is capable of pivotal movement in any direction in respect of the first vehicle. Rotatably mounted in the frame 21 of the chassis is a stud 22 retained in place by the shoulder 23 on one side of the frame and the flanged nut 24 threaded into the stud on the other side of the frame. The lower end of the stud is hollowed to provide a hemi-spherical socket and this socket is lined with Babbitt metal 26 to form a seat for half of the head 17. The stud is provided with a chamber in which lubricant 27 is packed, and a passage 28 through the nut, closed by the cap 29, provides means for introducing the lubricant into the chamber. A hole 30 leads from the chamber into the interior of the bearing so that the head is properly lubricated, and lubricating holes 31 lead to the stud bearing. The other half of the head is seated in a stud 32 similar in structure to that just described and rotatably mounted in a frame 33 pivotally mounted on the shaft 34 held in the vehicle chassis. The stud 32 is secured in the frame 33 by the nut 36 which also closes the lubricant chamber 37 into which any excess lubricant in the babbitted bearing draws through the passage 38. This nut which seats in a thrust ring 39 may be removed from time to time to renew the material in the chamber.

The walls of the hemi-spherical bearings are slotted as at 41 above and below the neck 42 connecting the plate 16 with the head 17, to permit movement of the neck in a vertical plane and to permit it to twist about its axis, and to prevent lateral movement of the neck in respect of the studs. Lateral movement of the coupling link is thus permitted by the journaling of the studs in the frames 21 and 33 and movement in longitudinal and transverse vertical planes by the journaling of the spherical head in the socket in the studs. That is to say, the link is pivotally movable in any direction in respect to the chassis in which it is journaled.

Means are provided for moving the frame 33 to aline the lower stud 32 with the upper stud 22 to form a bearing for the head, or to drop the lower stud away from the upper one to free the head. A shaft 43 rotatably mounted in the frame of the vehicle is provided with an eccentric disk 44 connected by eccentric link 46 with the pin 47 secured in the frame 33. Rotation of the shaft 43 thus oscillates the frame 33 about its mounting. The parts are so arranged that with the eccentric disk thrown forward to its maximum to seat the lower stud socket about the head, the plane determined by the axes of the shaft 43 and pin 47, will pass through the center of the head and through the eccentric disk so as to divide it symmetrically. That is, the eccentric is on a dead center with respect to the stress exerted by the frame 33 due to the thrust of the head 17.

Means are provided for turning the shaft 43 to operate the eccentric and lower socket, and such means preferably comprises an operating lever and a reversible ratchet connection with the shaft 43. Fixed on the end of the shaft 43, which extends through the side of the vehicle frame for the purpose, is a square-tooth ratchet wheel 48. Rotatably mounted on the shaft is a handle 49 which encloses the ratchet wheel. A spring pressed latch 51 rotatably and axially movable in the handle and adapted to engage the teeth of the ratchet, is controlled by the rod 52, terminating in a handle portion 53 turned at right angles to the main body of the rod and held behind a clip 54 having a notch 56 therein. By moving the rod 52 axially to disengage the latch from the ratchet wheel and the handle 53 from the clip 54, the rod may be turned 180° to reverse the operation of the ratchet, or the handle 53 may be turned 90° and allowed to seat in the notch 56 so that the ratchet is inoperative. The handle 49 is reciprocated, (the latch first being set as desired) to open or close the lower socket of the coupling.

A pair of studs as above described is arranged on each end of the vehicle, and a control lever is also arranged at each end but on opposite sides of the vehicle frame. Both ends of each vehicle are thus provided with like coupling means, so that two vehicles may be coupled without turning either around.

The coupling while providing a tight connection between successive vehicles of the road train and eliminating all slack between the successive vehicles, permits a universal movement of one vehicle with respect to the other. The journaling of the socket studs on a vertical axis, permits the movement of one vehicle into angular position with respect to the other, as occurs when the train makes a turn in the road. The spherical socket and head permits an angular movement in a vertical plane of one vehicle with respect to the other, as occurs when the road train passes over dips or rises in the road and also permits a transverse angular movement of one vehicle with respect to the other, as occurs when one of the wheels of one vehicle passes over a hump or a depression in the road.

I claim:

1. A coupling for connecting vehicles together comprising a link attached to one of the vehicles, sectional means having pivot studs, for journaling one end of said link on the other of said vehicles whereby said link is universally movable with respect to said other vehicle, and means for withdrawing a section of said journaling means to free said link from said other vehicle.

2. A coupling for connecting two vehicles comprising a coupling link journaled to the front of the second vehicle, a spherical head on the end of said link, and socket means having studs journaled on the first vehicle in a normally vertical axis, in which socket said head is adapted to be journaled.

3. A coupling for connecting two vehicles, comprising a coupling link journaled to the front of the second vehicle, a spherical head on the end of said link, socket sections having studs journaled on the first vehicle in a normally vertical axis in which said head is adapted to be journaled, and means in the studs for lubricating said bearings.

4. A coupling for connecting two vehicles, comprising a coupling link journaled to the front of the second vehicle, a spherical head on the end of said link, means journaled on the body of the first vehicle in a normally vertical axis in which said head is adapted to be journaled, and means for separating said vertically journaled means to release said head.

5. A coupling for connecting two vehicles, comprising a coupling link journaled to the front of the second vehicle, means journaled on the first vehicle and provided with a bearing, and a head on said link adapted to be journaled in said bearing for movement therein in a plane perpendicular to the axis of said journaled means.

6. A coupling for connecting two vehicles, comprising a coupling link journaled to the front of the second vehicle, a pair of studs each having a half bearing formed therein journaled on the first vehicle, a head on said link adapted to be journaled in said half bearings when combined, and means for separating said studs to release said head.

7. A coupling for connecting two vehicles, comprising a coupling link journaled to the front of the second vehicle, a stud having a half bearing formed therein journaled on the body of the first vehicle, a frame pivoted on said body, a second stud having a half bearing therein complementary to the first and journaled on said frame, means for moving said frame to combine and separate said bearings, and a head on said link adapted to be journaled in said combined bearings.

8. A coupling for connecting two vehicles, comprising a coupling link journaled to the front of the second vehicle, a stud having a half bearing formed therein journaled on the body of the first vehicle, a frame pivoted on said body, a second stud having a half bearing therein complementary to the first and journaled on said frame, a link connected to said frame, an eccentric disk for actuating said last named link, and a lever for turning said eccentric to move said frame to combine and separate said bearings, and a head on said coupling link to fit said bearings.

9. A coupling for connecting two vehicles, comprising a coupling journaled to the front of the second vehicle, a stud having a half bearing formed therein journaled on the body of the first vehicle, a frame pivoted on said body, a second stud having a half bearing therein complementary to the first and journaled on said frame, an operating lever on the side of said vehicle body and means mediately connecting said lever and said frame whereby the frame may be moved to combine and separate said bearings.

10. A coupling for connecting two vehicles, comprising a coupling link journaled in a normally horizontal axis to the front of the second vehicle and bowed about the end of the body of said second vehicle so as to clear the same, and means for journaling said link on the body of the first vehicle whereby said link is universally movable in respect of said first vehicle, the link forming a resilient connection.

11. A coupling for connecting two vehicles comprising a bow shaped, resilient link attached to one of the vehicles, an enlarged head arranged beyond the bow of said link, braces for said head, and a bearing on the other of said vehicles, in which said head is journaled.

In testimony whereof, I have hereunto set my hand at San Francisco, California, this 20th day of May, 1919.

ROLLIE B. FAGEOL.

In presence of—
H. G. PROST.